US006733680B2

(12) United States Patent
Witteler et al.

(10) Patent No.: US 6,733,680 B2
(45) Date of Patent: May 11, 2004

(54) USE OF PARTICULATE POLYMERS AS FILTER AIDS FOR AQUEOUS LIQUIDS

(75) Inventors: Helmut Witteler, Wachenheim (DE); Christian Drohmann, Schifferstadt (DE); Axel Sanner, Frankenthal (DE); Loni Schweikert, Altrip (DE); Karl Kolter, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/021,347

(22) Filed: Dec. 19, 2001

(65) Prior Publication Data

US 2002/0121488 A1 Sep. 5, 2002

(30) Foreign Application Priority Data

Dec. 27, 2000 (DE) .......................... 100 65 427

(51) Int. Cl.$^7$ ............................... B01D 37/02
(52) U.S. Cl. ...................... 210/777; 210/193
(58) Field of Search ................ 210/777, 778, 210/193

(56) References Cited

U.S. PATENT DOCUMENTS

| 3,890,224 A | 6/1975 | Weiss et al. ................. 210/30 |
| 4,344,846 A | 8/1982 | Klein ......................... 210/503 |
| 4,658,002 A | 4/1987 | Tschang et al. ............. 526/264 |
| 5,094,867 A | 3/1992 | Detering et al. ............ 426/271 |
| 5,262,053 A | 11/1993 | Meir .......................... 210/636 |
| 5,484,620 A | 1/1996 | Oechsle et al. ............. 426/422 |

FOREIGN PATENT DOCUMENTS

| DE | 38 18 868 | 12/1989 |
| DE | 40 00 978 | 7/1991 |
| DE | 41 25 594 | 6/1992 |
| DE | 199 20 944 | 11/2000 |
| EP | 48 309 | 3/1982 |
| EP | 879 629 | 11/1998 |
| EP | 1 031 585 | 8/2000 |
| WO | WO 96/35497 | 11/1996 |

OTHER PUBLICATIONS

Roempp's Chemistry Lexicon 9th Edition pp. 1355–1359.

*Primary Examiner*—Robert James Popovics
(74) *Attorney, Agent, or Firm*—Keil & Weinkauf

(57) ABSTRACT

The description is given of the use of particulate water-insoluble polymer preparations comprising at least one polymer P that is essentially made up of hydrophilic polymer segments and hydrophobic polymer segments as filter aids for filtering aqueous liquids.

26 Claims, No Drawings

USE OF PARTICULATE POLYMERS AS FILTER AIDS FOR AQUEOUS LIQUIDS

The present invention relates to the use of particulate water-insoluble polymer preparations as filter aids for filtering aqueous liquids, and to a process for filtering aqueous liquids using these filter aids.

Separating solid-liquid mixtures by filtration is an important process step in many industrial production processes. In particular when aqueous liquids are filtered, filter aids are frequently used. Filter aids are particulate, for example granulated, pulverulent or fibrous substances which, depending on the type and amount of solids present in the liquid to be filtered, make it possible for a filter cake to build up or are intended to loosen this.

The action of the filter aid is based on developing capillaries in the filter cake which, firstly, are small enough to retain solids, but secondly are numerous enough in order to facilitate the outflow of the liquid phase. For this purpose the filter aid can be added to the suspension to be filtered (pulp) and/or the filter aid can be applied before the filtration as an auxilliary layer on the filter surface (filter cloth). In precoat filtration, for example before the start of filtration, a filter aid precoat is applied to a support surface (filter cloth). The filter aid is then added to the pulp, preferably continuously. During the filtration a loose filter cake of filter aid thus forms, which retains the pulp solids, so that the liquid dispersion medium can flow off as clear filtrate (see also "Roempp Chemielexikon" [Roempp's chemistry lexikon], 9th edition, Georg Thiemer Verlag Stuttgart, pp. 1357 ff. for the terms filter aid and filtration).

Obviously, the filter aids should be chemically inert and insoluble in the pulp to be filtered. In addition, under the action of pressure, they should not deform, so that the pores in the filter cake do not collapse. Furthermore, it is desirable that the filter aids can be regenerated.

The most customary filter aids, in addition to organic substances such as cellulose, wood charcoal and wood powder, comprise inorganic materials, in particular of silicate nature, such as kieselguhr, pearlites, diatomaceous earths and bentonites. However, these materials have the disadvantage that they cannot be regenerated and therefore must be disposed of.

In the drinks industry especially, there is a great requirement for filter aids for aqueous liquids, since fruit juice drinks and fermented beverages such as beer are frequently subjected to filtration. A filter aid frequently used in the drinks industry is kieselguhr. In the production of beer, for example, from 150 to 200 g of filter aid, in particular kieselguhr, are required per hl of beer. Since the filtering action of these filter aids decreases after a certain time, they must be removed and, in the case of the non-regenerable filter aids, disposed of, which obviously is associated with high costs. In addition, a carcinogenic action of the kieselguhr used in the drinks industry is currently a subject of discussion.

There has therefore been no lack of attempts to provide synthetic filter aids. U.S. Pat. No. 4,344,846, for example, describes the use of expanded polystyrene in precoat filtration.

WO 96/35497 and EP 48309 describe filter aids for precoat filtration which are based on spherical, incompressible polymers, for example polyvinylpyrrolidone or Nylon 11, which form a filter cake having a porosity in the range from 0.3 to 0.5.

EP-A 879629 describes filter aids which consist of a particulate or fibrous support and a hydrophobic coating applied thereon.

EP-A 177812 and EP-A 351363 disclose highly crosslinked, scarcely swellable, pulverulent polymers based on N-vinylpyrrolidone which can be used as filter aids.

DE-A 19920944 describes insoluble, scarcely swellable popcorn polymers based on styrene and N-vinyllactams. The use of these popcorn polymers as filter aids is proposed.

The synthetic filter aids based on polymers have an improved regenerability. However, their filtering action sometimes leaves something to be desired. Some of the synthetic filter aids are again less suitable for precoat filtration of aqueous liquids, since they do not sediment in water, or only sediment poorly.

It is an object of the present invention to provide filter aids for filtering aqueous liquids, which filter aids have a good filtering action and are suitable for precoat filtration. In addition, good regenerability of the filter aids is desired.

We have found that this object is achieved, surprisingly, by particulate polymer preparations that comprise a polymer P that is made up of hydrophilic and hydrophobic polymer segments.

The present invention therefore relates to the use of particulate water-insoluble polymer preparations comprising at least one polymer P that is essentially made up of hydrophilic polymer segments and hydrophobic polymer segments, as filter aids for filtering aqueous liquids, in particular for precoat filtration. The invention also relates to a process for filtering aqueous liquids using such polymer preparations, in particular a process which is carried out by the method of precoat filtration.

In the polymers P used according to the invention, the polymer particles essentially consist of hydrophilic polymer segments and hydrophobic polymer segments. Polymer segments are understood by those skilled in the art to be polymer chains or polymer substructures that are made up of a plurality, generally at least 10, preferably at least 20, preferred according to the invention at least 30, identical repeat units. Hydrophobic polymer segments are accordingly polymer substructures or polymer chains that are made up of a plurality of hydrophobic monomer building blocks that are linked to one another. Correspondingly, hydrophilic polymer segments are polymer chains or polymer substructures that are made up of a plurality of hydrophilic monomer building blocks as repeat units. The hydrophilic and hydrophobic polymer segments can be bound to one another by chemical bonds in the manner of a block polymer or grafted polymer. They can also be present as an intimate physical mixture in the polymer P used according to the invention. It is important solely that the individual polymer particles of the polymer P are made up both of hydrophilic and of hydrophobic polymer segments.

For the inventive water insolubility it is advantageous if the proportion by weight of hydrophilic polymer segments does not exceed that of the hydrophobic polymer segments. Generally, therefore, the weight ratio of hydrophilic polymer segments to hydrophobic polymer segments in the polymer P is in the range from 1:1 to 1:100, preferably in the range from 1:2 to 1:50, and particularly preferably in the range from 1:3 to 1:20.

Furthermore, it has proved to be expedient if the hydrophilic polymer segments are of nonionic nature, that is to say have less than 0.1 mol/kg of ionic or ionogenic groups such as carboxylate, sulfonate or amino groups. Particularly preferably, the hydrophilic polymer segments have no ionic or ionogenic groups.

Examples of nonionic hydrophilic polymer segments are those that are made up of ethylenically unsaturated monomers having a water solubility above 50 g/l (at 25° C., 1 bar), further polyvinylalcohol structures, and polyether chains. Examples of monomers having a water solubility above 50 g/l are methyl acrylate, acrylamide, methacrylamide, hydroxyalkyl acrylates and hydroxyalkyl methacrylates such as hydroxyethyl acrylate, hydroxypropyl acrylate, hydroxyethyl methacrylate, hydroxypropyl methacrylate, N-vinylpyrrolidone, N-vinylcaprolactam, methyl vinyl ether and comparable monomers.

Preferred hydrophilic polymer segments have a polyether structure, in particular a poly-$C_2$–$C_4$-alkylene ether structure. Particularly preferably, the hydrophilic polymer segments are derived from polyethylene oxides, polypropylene oxides and/or polyethylene/polypropylene oxide block copolymers, for example block copolymers having a central polypropylene oxide segment and terminal polyethylene oxide segments.

It has further proved to be advantageous if the hydrophilic polymer segments, considered alone, have only limited water solubility. This is achieved, for example, via high molecular weights, for example greater than 10 000, preferably 50 000 daltons, and in particular 100 000 daltons, or by using hydrophilic segments of block-type structure that have oligomeric blocks of limited water solubility, for example polyethylene oxide/polypropylene oxide segments, the polypropylene block causing a reduction of the water solubility of the hydrophilic segment. Here, molecular weights in the range from 1 000 to 20 000 daltons are sufficient. Obviously, both measures can be combined with one another.

In a preferred embodiment of the invention, particulate polymers are used whose hydrophilic segments are selected from polyethylene oxide-polypropylene oxide block copolymers (EO/PO block copolymers), and in particular from triblock copolymers having a central polypropylene oxide block. The proportion of the polypropylene oxide block makes up preferably from 10 to 90% by weight, and in particular from 30 to 80% by weight, of the EO/PO block copolymer.

Preference is given to those particulate polymers in which the hydrophilic polymer segments are selected from the abovementioned polyalkylene oxides, in particular from polyethylene oxide/polypropylene oxide block copolymers, and the hydrophobic polymer segments are essentially formed from vinylaromatic monomers A.

The hydrophobic polymer segments are generally made up of ethylenically unsaturated hydrophobic monomers A. The hydrophobic nature of the monomer A is expressed in their low water solubility that generally does not exceed 10 g/l, and in particular does not exceed 1 g/l at 25° C. Examples of hydrophobic monomers A are vinylaromatic monomers, esters of ethylenically unsaturated carboxylic acids such as acrylic acid or methacrylic acid with alcohols that have at least 2, preferably at least 4 carbon atoms, for example from 2 to 10 carbon atoms. Further examples of hydrophobic monomers A are olefins such as ethene and propene and diolefins such as butadiene. Preferred monomers A are the vinylaromatic monomers, in particular styrene, α-methylstyrene and styrene derivatives having alkyl groups on the benzene ring, such as vinyl toluenes and 4-tert-butylstyrene. A particularly preferred vinylaromatic monomer A is styrene. Generally, the hydrophobic polymer segments contain less than 20% by weight, preferably less than 10% by weight, and in particular none, of copolymerized comonomers B that are different from the monomers A. Preferably, at least 80% by weight, in particular at least 90% by weight, and in particular all, monomers A are selected from vinylaromatic monomers. Any comonomers B which come into consideration are the abovementioned hydrophilic monomers, and other customary monomers that are copolymerizable with styrene, for example ethylenically unsaturated nitriles such as acrylonitrile, ethyl acrylate, methyl methacrylate or vinyl acetate.

In addition, it has proved to be advantageous if the hydrophobic polymer segments have a glass transition temperature above 50° C., in particular above 70° C., and particularly preferably above 80° C. The glass transition temperature here is the mid-point temperature determined by DSC (see ASTM-D3418-82). A high glass transition temperature is advantageous, in particular, with regard to a desired low compressibility of the polymer P.

In addition, it has proved to be expedient if the particulate polymer preparations have particle sizes less than 1 mm, preferably in the range from 1 µm to 700 µm, in particular from 2 µm to 500 µm, and particularly preferably from 5 to 200 µm. The values specified here are to be taken to mean that 90% by weight of the particles of the polymer preparation have a diameter in the specified range. The particle sizes can be determined in a conventional manner, for example by light scattering or by sieve methods.

The preparation of the polymer preparations to be used inventively is known in principle and is performed, depending on the desired particle size, by granulation, shredding and/or grinding polymers P and/or compounded materials that comprise further filter aids, or by drying, that is to say by removing the volatile constituents from a solution or suspension of the polymers P, which may comprise further filter aids. Preferably, aqueous dispersions/suspensions of the polymer P or of a mixture of the polymer P are used for drying.

The dispersions/suspensions to be dried can be not only aqueous primary dispersions but also secondary dispersions. Primary dispersions are prepared, as is known, by polymerizing hydrophobic monomer building blocks in an aqueous dispersion medium, preferably in the presence of hydrophilic polymers as surface-active substances. Secondary dispersions are obtained, for example, by dispersing polymers A prepared in a different manner, for example by solution polymerization or solvent-free polymerization, in the aqueous dispersion medium. Secondary dispersions can also be prepared by emulsifying a solution of the polymer P in an organic solvent in an aqueous emulsifying medium. These solutions are then converted into an aqueous dispersion or suspension by a known method. For this purpose a sufficient amount of water, for example, can be added to the polymer solutions and then the organic solvent can be removed, for example can be distilled off, preferably with a vacuum being applied. Suitable organic solvents for preparing the secondary dispersion are those that are able to dissolve the polymer containing hydrophilic and hydrophobic segments and which can be removed by distillation. The type of the respective solvent obviously depends on the type of hydrophilic and hydrophobic segments, and can be determined by a person skilled in the art by means of simple routine experiments.

Examples of suitable organic solvents are $C_1$–$C_{10}$ alkyl esters of aliphatic carboxylic acids, such as acetic acid or propionic acid, for example ethyl acetate, n-butyl acetate, tert-butyl acetate, aromatic hydrocarbons, such as toulene or tert-butylbenzene, ethers, such as tetrahydrofuran, dioxane or tert-butyl methyl ether, ketones such as acetone or methyl ethyl ketone, and the like.

The particulate polymers are then produced by removing the volatile components from the resultant aqueous dispersions by customary methods of powder production, for example by freeze-drying or by spray-drying, or, in the case of coarse suspensions, by filtration.

Polymers P containing hydrophilic segments and hydrophobic segments for preparing the particulate polymer prepararations to be used according to the invention are known from the prior art or can be prepared by customary methods.

For the inventive use, it has been found to be particularly advantageous if, for preparing the particulate polymer P, those polymers are used which have been prepared by one of the preparation methods described below:
i) polymerizing the hydrophobic monomer building blocks in the presence of at least one hydrophilic polymer, or
ii) polymerizing the hydrophilic monomer building blocks in the presence of at least one hydrophobic polymer.

Polymerization by method i), and also the polymerization by method ii) can be performed by the customary polymerization processes, for example by a polyaddition, polycondensation or a free-radical polymerization process, with the latter procedure generally being preferred.

Usually, to prepare the polymer P, those polymerization conditions are selected in which linkage occurs, that is to say development of chemical bonds between the polymer segments. In the case of polyaddition processes, therefore, preferably those polymers are used as a grafting base that have functional groups which can react with the monomer building blocks. In the case of free-radical polymerization processes, preferably a procedure is followed in such a manner that the grafting base used is a polymer which has graft-active carbon atoms and the polymerization conditions are chosen so that active grafting of the monomers to be polymerized to the introduced polymer occurs. Processes for this are known from the prior art.

Frequently, a polymer P is used which is obtainable by free-radical polymerization of ethylenically unsaturated hydrophobic monomers A, in the presence or absence of copolymers B which are different therefrom, in the presence of a hydrophilic polymer. This then forms in the polymer P the hydrophilic segments, whereas the hydrophobic segments are formed by the polymerized monomers A. In this procedure the abovementioned hydrophobic monomers A are reacted in the presence of a suitable hydrophilic polymer that preferably has the abovementioned characteristics.

Examples of hydrophilic polymers are therefore polyvinyl alcohols, homopolymers and copolymers which are predominantly made up of vinyllactams such as N-vinylpyrrolidone, polyvinyl methyl ethers and polyalkylene oxides, with the last-mentioned being preferred. Particular preference is given to the abovementioned polyethylene oxide/polypropylene oxide block copolymers and polyethylene oxides having molecular weights >10 000 daltons. Polymers of this type are, under free-radical polymerization conditions, sufficiently graft-active in order to ensure at least partial linkage of the hydrophilic polymer chains to the forming hydrophobic polymer chains.

The free-radical polymerization of the hydrophobic monomers in the presence of at least one hydrophilic polymer is preferably performed as solution polymerization in an organic solvent that is able to dissolve both components, or as solvent-free polymerization.

Generally, the free-radical polymerization is carried out in the presence of polymerization initiators which are customary for this that decompose on heating with the formation of free-radical polymerization centers. Examples of such compounds are organic peroxides, for example peresters of carboxylic acids, such as tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, percarbonates, such as di-(2-ethylhexyl) peroxodicarbonate, dicyclohexyl peroxodicarbonate, di-(4-tert-butylcyclohexyl) peroxodicarbonate, in addition ketone peroxides, such as acetylacetoneperoxide, methyl ethyl ketone peroxide, hydroperoxides such as tert-butyl hydroperoxide and cumene hydroperoxide, in addition azo initiators such as 2-2'-azobis(amidinopropane) dihydrochloride, 2,2'-azobis(N,N'-dimethylene)isobutyramidine dihydrochloride, 2-(carbamoylazo)isobutyronitrile, 2,2-azobisisobutyronitrile, or 4,4'-azobis(4-cyanovaleric acid). Initiators of this type are generally used in an amount of from 0.01 to 5% by weight, and preferably in an amount of from 0.05 to 2.0% by weight, based on the amount of monomers to be polymerized. The polymerization temperature required depends, in a known manner, on the type of monomers to be polymerized and is usually in the range from 20° C. to 200° C., in particular in the range from 50 to 180° C. Depending on the type of solvent used and on the type of monomers, pressure vessels are employed to reach the polymerization temperature. However, frequently, operation at atmospheric pressure is also possible.

If the free-radical polymerization is carried out as solution polymerization, the customary solvents come into consideration for this, preferably the abovementioned solvents, such as diesters of aliphatic carboxylic acids, for example diesters of acetic acid and/or diesters of propionic acid, aromatic hydrocarbons or ketones such as acetone or methyl ethyl ketone. Solution polymerization in addition has the advantage that the resultant polymer solutions can be converted directly into aqueous dispersions of the resultant polymers, which themselves are preferred for preparing the polymer powders.

The starting materials depend on the respective polymerization process, obviously in accordance with the desired composition, that is to say the type and amount of hydrophobic monomer building blocks correspond to the type and proportion by weight of the hydrophobic polymer segments, and the type and amount of the hydrophilic polymers correspond to the type and amount of the hydrophilic polymer segments in the polymer P.

The particulate polymers P to be used according to the invention are distinguished by good filtration action and, in contrast to the customary filter aids, can be more easily regenerated. In addition, they have improved sedimentation in water, so that they are suitable in particular as filter aids for precoat filtration of aqueous liquids.

The polymer preparations to be used according to the invention can consist solely of the polymer P. However, they can also comprise other conventional filter aids. The content of these conventional filter aids will generally not exceed 80% by weight, preferably 50% by weight of the total amount of polymer P and conventional filter aid.

Conventional filter aids are selected from the abovementioned silicate filter aids and the polymeric filter aids. Preference is given to polymeric filter aids such as crosslinked polyvinylpyrrolidone, polystyrenes or polyamides. In a preferred embodiment, the polymer preparations to be used comprise:
a. from 10 to 95% by weight, in particular from 15 to 80% by weight, particularly preferably from 25 to 70% by weight, of at least one polymer P, and
b. from 90 to 5% by weight, in particular from 85 to 20% by weight, particularly preferably from 30 to 75% by weight, of at least one further conventional filter aid.

Preferred conventional filter aids for these uses are selected from synthetic filter aids based on organic polymers, in particular based on styrene polymers and/or polyamides.

The term "styrene polymer" is to be taken to mean the entire group of "styrene homopolymers and copolymers", as described in A. Aechte; Handbuch der technischen Polymerchemie [Handbook of Industrial Polymer Chemistry], VCH Weinheim 1993. This definition includes both homopolystyrene and copolymers of styrene, in particular with acrylonitrile, maleic anhydride, with acrylate and similar comonomers, and their rubber-modified or toughened derivatives. Suitable polyamides include, in particular, Nylon 12.

The present invention also relates to a process for filtering aqueous liquids, in particular to a process which is carried out by the method of precoat filtration. Owing to their chemical inertness, the polymer powders to be used according to the invention are suitable in particular for use in the food industry, for example for filtering fruit juice drinks and fermented beverages. Owing to their good filtration action, the polymer powders to be used according to the invention are particularly suitable for filtering beer.

The filtration processes can be carried out in a similar manner to the filtration methods of the prior art described at the outset using the above-described polymer powders as filter aids.

In the case of precoat filtration, generally, before the start of filtration, a precoat of the polymer powders to be used according to the invention are applied to a support surface (filter cloth). The liquid to be filtered is then passed through the filter layer by applying a pressure difference, with further polymer powder to be used according to the invention preferably being added as filter aid to the liquid to be filtered during the filtration operation.

The following examples are intended to describe the invention in more detail, but without restricting it thereto.

I. Preparation of Polymers Having Hydrophilic and Hydrophobic Segments (Polymers P1, P2 and P3):

In a reaction vessel, styrene, a polyether (triblock EO/PO/EO polymer) and ethyl acetate as solvent are dissolved. The reaction vessel is inertized, heated to 78° C. and then tert-butyl perpivalate is added as initiator. Polymerization is carried out for 2 h, with the temperature being maintained, and the mixture is then cooled to room temperature. The resultant polymer solutions are further processed to produce the polymer powders. The starting materials are specified in table 1.

TABLE 1

| Polymer | Styrene [g] | Polyether[1)] [g] | Ethyl acetate [g] |
|---|---|---|---|
| P1 | 40 | 10 | 50 |
| P2 | 45 | 5 | 50 |
| P3 | 400 | 40 | 200 |

[1)]triblock copolymer of ethylene oxide/propylene oxide/ethylene oxide having a content by weight of polypropylene oxide of 60% and a number average $M_n$ of 4 600 daltons.

II. Production of the Polymer Preparation (Powders FH1 to FH4)

The polymer solutions from I are dissolved, with or without polystyrene, in 360 g of ethyl acetate. 360 g of water are then added to this solution. The mixture is then concentrated under reduced pressure to about half the volume. This produces an aqueous suspension which is filtered and washed with water. The filter residue is then obtained. This produces a free-flowing powder that consists of small polymer beads having diameters in the range from 5 to 500 µm.

The starting materials of this reaction are described in table 2.

TABLE 2

| Filter aid | Polymer P type [g] | Polystyrene[1] [g] |
|---|---|---|
| FH1 | P1 | 40 | 40 |
| FH2 | P2 | 80 | 0 |
| FH3 | P3 | 120 | 60 |
| FH4 | P3 | 60 | 120 |
| FH5 | P3 | 33 | 135 |
| FH6 | P3 | 50 | 120 |

[1]polystyrene type 168 N (BASF AG)

III. Application-Oriented Testing

III.1 Sedimentation in Water

Sedimentation was determined visually. For this an aliquot of filter aid was suspended in water by shaking in a measuring cylinder. When more than 90% of the particles sediment, the test is rated as positive.

TABLE 3

Sedimentation in water

| Filter aid | Sedimentation in water |
|---|---|
| Polystyrene[1] (C) | no |
| Polyamide[2] (C) | no |
| Kieselguhr (C) | yes |
| FH1 | yes |
| FH2 | yes |
| FH3 | yes |
| FH4 | yes |
| FH5 | yes |
| FH6 | yes |

C = comparison
[1]Polystyrene 158 K, cold-milled and sieved
[2]Nylon 12, Vestosint type 1611 from Degussa-Hüls Table 3 confirms the good sedimentation of the inventive filter aids and thus their suitability for precoat filtration of aqueous liquids.

III.2 Filtration of a Standard Haze Solution

The filtration action is determined from the clarification of a standard haze solution, that is to say a formazin suspension with defined haze. These solutions are known to those skilled in the art for characterizing filter aids for the drinks industry. The study is carried out as precoat filtration. For this the formazin suspension containing the inventive filter aid was filtered in accordance with the EBC test at a precoat pressure of 4.5 bar and a flow rate of 20 l h$^{-1}$ (in each case initial values). After a flow of 5 l, 10 l and 15 l through the filter the haze was determined by the EBC method. The filtrate is considered to be clear if the EBC value is less than 1. Alternatively, the EBC value can also be determined by determining the nephelometric haze (FNU value), where 1 EBC=4 FNU. The results are reported in table 4.

During the entire investigation, both precoat pressure and filtration rate remained constant, which verifies the advantageous properties of the inventive filter aids (high service life).

The haze is determined by the standard EBC (European Brewery Convention) test. A liquid is judged to be clear when the EBC haze values are <1.

The studies below were carried out with the polymer powders FH4 to FH6 from II.

TABLE 4

| Sample: EBC haze after passage of | FH4 | FH5 | FH6 |
|---|---|---|---|
| 5 l | 4.05 | 1.88 | 0.88 |
| 10 l | 2.99 | 0.50 | 0.35 |
| 15 l | 0.32 | 0.33 | 0.18 |

We claim:

1. A process for filtering an aqueous liquid using filter aids, which comprises filtering the aqueous liquid using as filter aid a particulate water-insoluble polymer preparation consisting of at least one polymer P that is essentially made up of hydrophilic polymer segments and hydrophobic polymer segments, or of a mixture of said polymer P with a conventional filter aid.

2. A process as claimed in claim 1, wherein in polymer P the weight ratio of hydrophilic polymer segments to hydrophobic polymer segments is in the range from 1:1 to 1:100.

3. A process as claimed in claim 1, wherein the hydrophilic polymer segments are of nonionic nature.

4. A process as claimed in claim 1, wherein the hydrophilic polymer segments have a polyalkylene ether structure.

5. A process as claimed in claim 1, wherein the hydrophobic polymer segments are essentially made up of ethylenically unsaturated hydrophobic monomers A.

6. A process as claimed in claim 5, wherein the monomers A are selected from vinylaromatic monomers.

7. A process as claimed in claim 1, wherein the polymer P is obtainable by free-radical polymerization of ethylenically unsaturated monomers comprising at least 80% by weight of hydrophobic monomers A and with or without up to 20% by weight of the comonomers B which are different from monomers A, in the presence of at least one hydrophilic polymer which forms the hydrophilic segments in the polymer P.

8. A process as claimed in claim 1, wherein the polymer particles of the polymer P have a mean particle size in the range from 1 to 700 $\mu$m.

9. A process as claimed in claim 1, wherein the liquid to be filtered is a fruit juice drink or fermented beverage.

10. A process as claimed in claim 9, wherein the fermented beverage is beer.

11. A process as claimed in claim 1, wherein the polymer preparation additionally comprises a conventional particulate or fibrous filter aid.

12. A process as claimed in claim 11, wherein the conventional particulate filter aid is selected from polyamides and polystyrene.

13. A process as claimed in claim 11, wherein the filtration is carried out as precoat filtration.

14. A process as claimed in claim 1 wherein at least a part of the filter aid is applied to a filter cloth and the remainder of the filter aid is added to the liquid to be filtered during the filtration.

15. A process as claimed in claim 1, wherein the amount of polymer P in the particulate water-insoluble polymer preparation is at least 20% by weight.

16. A process for filtering an aqueous liquid using filter aids, which comprises using as filter aid a particulate water-insoluble polymer preparation comprising at least one polymer P that is essentially made up of hydrophilic polymer segments and hydrophobic polymer segments, wherein the hydrophilic polymer segments have a polyalkylene ether structure and the hydrophobic polymer segments are essentially made up of ethylenically unsaturated monomers comprising at least 80% by weight of hydrophobic monomers A and optionally up to 20% by weight of comonomers B which are different from hydrophobic monomers A.

17. A process as claimed in claim 16, wherein in polymer P the weight ratio of hydrophilic polymer segments to hydrophobic polymer segments is in the range from 1:1 to 1:100.

18. A process as claimed in claim 16, wherein in polymer P the weight ratio of hydrophilic polymer segments to hydrophobic polymer segments is in the range from 1:2 to 1:50.

19. A process as claimed in claim 16, wherein the polymer P is obtainable by free-radical polymerization of ethylenically unsaturated monomers comprising at least 80% by weight of hydrophobic monomers A and with or without up to 20% by weight of the comonomers B which are different from monomers A, in the presence of at least one hydrophilic polymer which forms the hydrophilic segments in the polymer P.

20. A process as claimed in claim 16, wherein the liquid to be filtered is a fruit juice drink or fermented beverage.

21. A process as claimed in claim 20, wherein the fermented beverage is beer.

22. A process as claimed in claim wherein the polymer preparation additionally comprises a conventional particulate or fibrous filter aid.

23. A process as claimed in claim 22, wherein the conventional particulate filter aid is selected from polyamides and polystyrene.

24. A process as claimed in claim 16, wherein the filtration is carried out as precoat filtration.

25. A process as claimed in claim 16, wherein at least a part of the filter aid is applied to a filter cloth and the remainder of the filter aid is added to the liquid to be filtered during the filtration.

26. A process as claimed in claim 16, wherein the amount of polymer P in the particulate water-insoluble polymer preparation is at least 20% by weight.

* * * * *

UNITED STATES PATENT AND TRADEMARK OFFICE
CERTIFICATE OF CORRECTION

PATENT NO. : 6,733,680 B2
DATED : May 11, 2004
INVENTOR(S) : Witteler et al.

It is certified that error appears in the above-identified patent and that said Letters Patent is hereby corrected as shown below:

Column 10,
Line 2, "Pin" should be -- P in --;
Line 1, "claim wherein" should be -- claim 16 wherein --.

Signed and Sealed this

Fifteenth Day of February, 2005

JON W. DUDAS
*Director of the United States Patent and Trademark Office*